United States Patent [19]

Dinur

[11] Patent Number: 5,443,212
[45] Date of Patent: Aug. 22, 1995

[54] DRIP IRRIGATION APPARATUS

[75] Inventor: Eldad Dinur, Kibbutz Naan, Israel

[73] Assignee: Naan Irrigation Systems, Kibbutz Naan, Israel

[21] Appl. No.: 280,147

[22] Filed: Jul. 25, 1994

Related U.S. Application Data

[63] Continuation of Ser. No. 187,807, Jan. 27, 1994, abandoned, which is a continuation of Ser. No. 21,484, Feb. 23, 1993, abandoned.

Foreign Application Priority Data

Feb. 26, 1992 [IL] Israel ......................................... 101071

[51] Int. Cl.⁶ ............................................. B05B 15/00
[52] U.S. Cl. ............................................. 239/542
[58] Field of Search .................. 138/43, 45; 239/542, 239/533.13, 570, 571

[56] References Cited

U.S. PATENT DOCUMENTS

| | | | |
|---|---|---|---|
| 3,926,375 | 12/1975 | Reeder et al. | 239/542 |
| 4,161,291 | 7/1979 | Bentley | 239/542 |
| 4,382,549 | 5/1983 | Christy et al. | 239/542 X |
| 4,423,838 | 1/1984 | Dinur | 239/1 |
| 4,428,397 | 1/1984 | Bron | 239/542 X |
| 4,519,546 | 5/1985 | Gorney et al. | 239/542 |
| 4,540,125 | 9/1985 | Gorney et al. | 239/232 |
| 4,655,397 | 4/1987 | Gorney | 239/542 |
| 4,687,143 | 8/1987 | Gorney et al. | 239/542 |
| 4,718,608 | 1/1988 | Mehoudar | 239/542 |
| 4,728,042 | 3/1988 | Gorney et al. | 239/542 |
| 4,796,660 | 1/1989 | Bron | 239/542 X |
| 4,850,531 | 7/1989 | Littleton | 239/542 X |
| 5,137,216 | 8/1992 | Hanish | 239/542 |
| 5,295,506 | 3/1994 | Smith | 239/542 X |

FOREIGN PATENT DOCUMENTS

| | | | |
|---|---|---|---|
| 633097 | 5/1989 | Australia . | |
| 0138636 | 4/1985 | European Pat. Off. . | |
| 2525496 | 4/1982 | France . | |
| 2614557 | 4/1987 | France . | |
| 53463 | 11/1977 | Israel . | |
| 57986 | 8/1979 | Israel . | |
| 60774 | 5/1983 | Israel . | |
| 57204 | 1/1985 | Israel . | |
| 807270 | 10/1981 | South Africa . | |
| 2018113 | 10/1979 | United Kingdom . | |
| 854326 | 8/1981 | U.S.S.R. | 239/542 |
| 8402828 | 2/1984 | WIPO . | |

Primary Examiner—Andres Kashnikow
Assistant Examiner—Kevin Weldon
Attorney, Agent, or Firm—Brumbaugh, Graves, Donohue & Raymond

[57] ABSTRACT

Drip irrigation apparatus including a housing including a water inlet, a water outlet and a water flow path extending therebetween and a pressure responsive membrane disposed within the housing and arranged to govern the flow of water, and wherein the orientation of the pressure responsive membrane is responsive to the pressure of the water impinging on the membrane at a plurality of different locations on the same side of the membrane which are separated from each other.

6 Claims, 8 Drawing Sheets

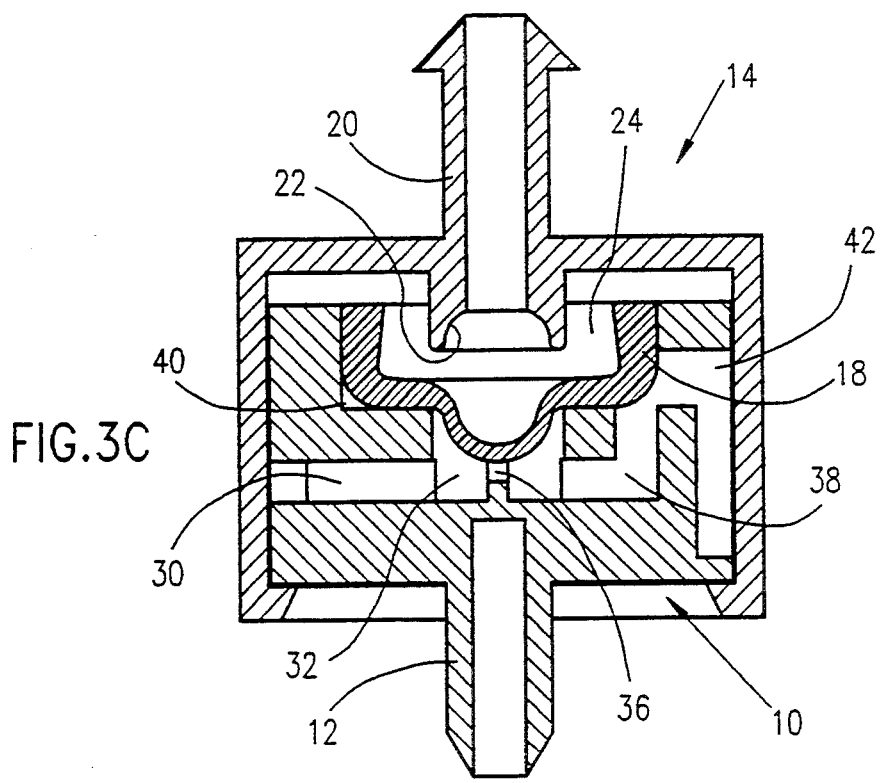
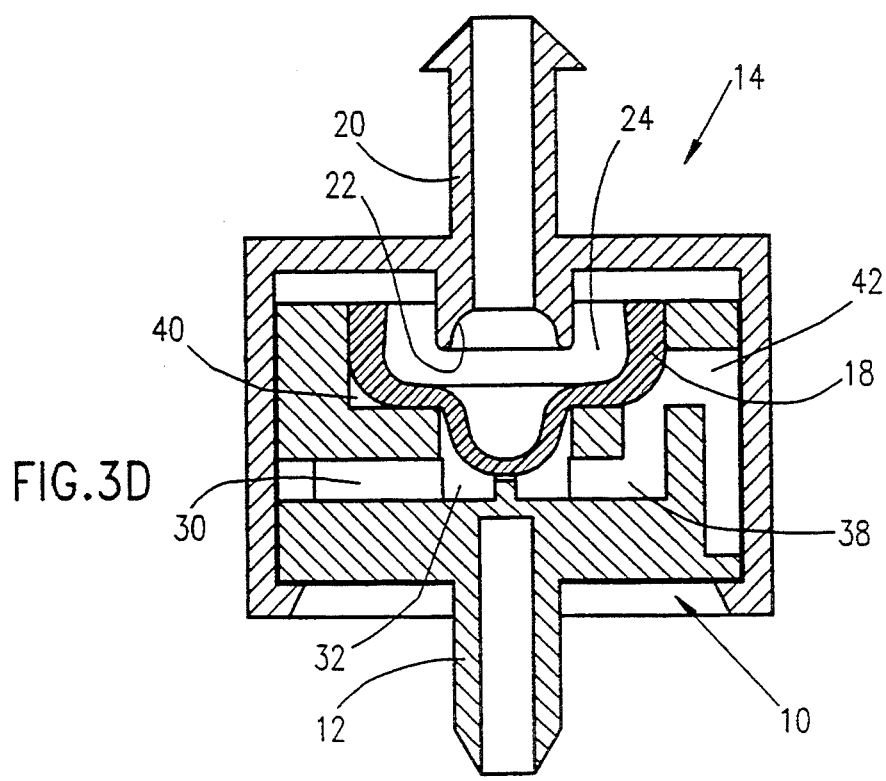

DRIP IRRIGATION APPARATUS

This is a continuation application of application Ser. No. 08/187,807, filed Jan. 27, 1994 (now abandoned) which was a continuation of application Ser. No. 08/021,484, filed Feb. 23, 1993 (now abandoned).

FIELD OF THE INVENTION

The present invention relates to drip irrigation emitters.

BACKGROUND OF THE INVENTION

A great variety of drip irrigation emitters are known in the art and in the patent literature.

The following list of patents of the applicant/assignee reflects a sampling of the development of drip irrigation technology:

U.S. Pat. Nos. 4,423,838; 4,519,546; 4,540,125; 4,655,397; 4,728,042; 4,687,143.

In recent years pressure compensated drip irrigation emitters have come into widespread use since they enable generally uniform irrigation outputs notwithstanding certain variations in input pressure and thus expand the range of applications of such emitters, Conventional pressure compensated drip irrigation emitters are capable of providing acceptable output uniformity over a limited input pressure range. This limitation greatly limits the application possibilities available for such emitters.

SUMMARY OF THE INVENTION

The present invention seeks to provide an improved pressure-compensated drip irrigation emitter.

The present invention seeks to provide a pressure compensated dripper which is operative to provide an output quantity having acceptable uniformity over a significantly greater range of input pressures than prior art pressure compensated drippers.

There is thus provided in accordance with a preferred embodiment of the present invention drip irrigation apparatus including a housing, a water inlet and a water outlet and a water flow path extending therebetween being defined in the housing, and a pressure responsive membrane disposed within the housing and arranged to govern the flow of water and wherein the orientation of the pressure responsive membrane is responsive to the pressure of the water impinging on the membrane at a plurality of different mutually spaced locations on the membrane.

Additionally in accordance with a preferred embodiment of the present invention, at the plurality of different mutually spaced locations on the membrane, the water communicates with different mutually spaced locations along the water flow path and is at different pressures.

Further in accordance with a preferred embodiment of the present invention, the membrane has two principal positions, a first position, in which the membrane seals the water inlet and a second position, in which the membrane modulates the quantity of water flowing through the water flow path.

Additionally in accordance with a preferred embodiment of the present invention, when the membrane is in its second position, i.e. during normal dripper operation, the precise orientation of the membrane and thus its modulation of the quantity of water flowing is affected by impingement of water on the membrane at at least two different mutually spaced locations on the membrane.

In accordance with a preferred embodiment of the present invention, the drip irrigation apparatus is operative to provide flow uniformity of approximately 10% over an input pressure range of between 1–8 Atm.

BRIEF DESCRIPTION OF THE DRAWINGS

The present invention will be understood and appreciated more fully from the following detailed description, taken in conjunction with the drawings in which:

FIGS. 3A, 3B, 3C and 3D are illustrations of four operative orientations of the drip irrigation emitter of FIGS. 1A–2B;

DETAILED DESCRIPTION OF A PREFERRED EMBODIMENT

Figure 1A:
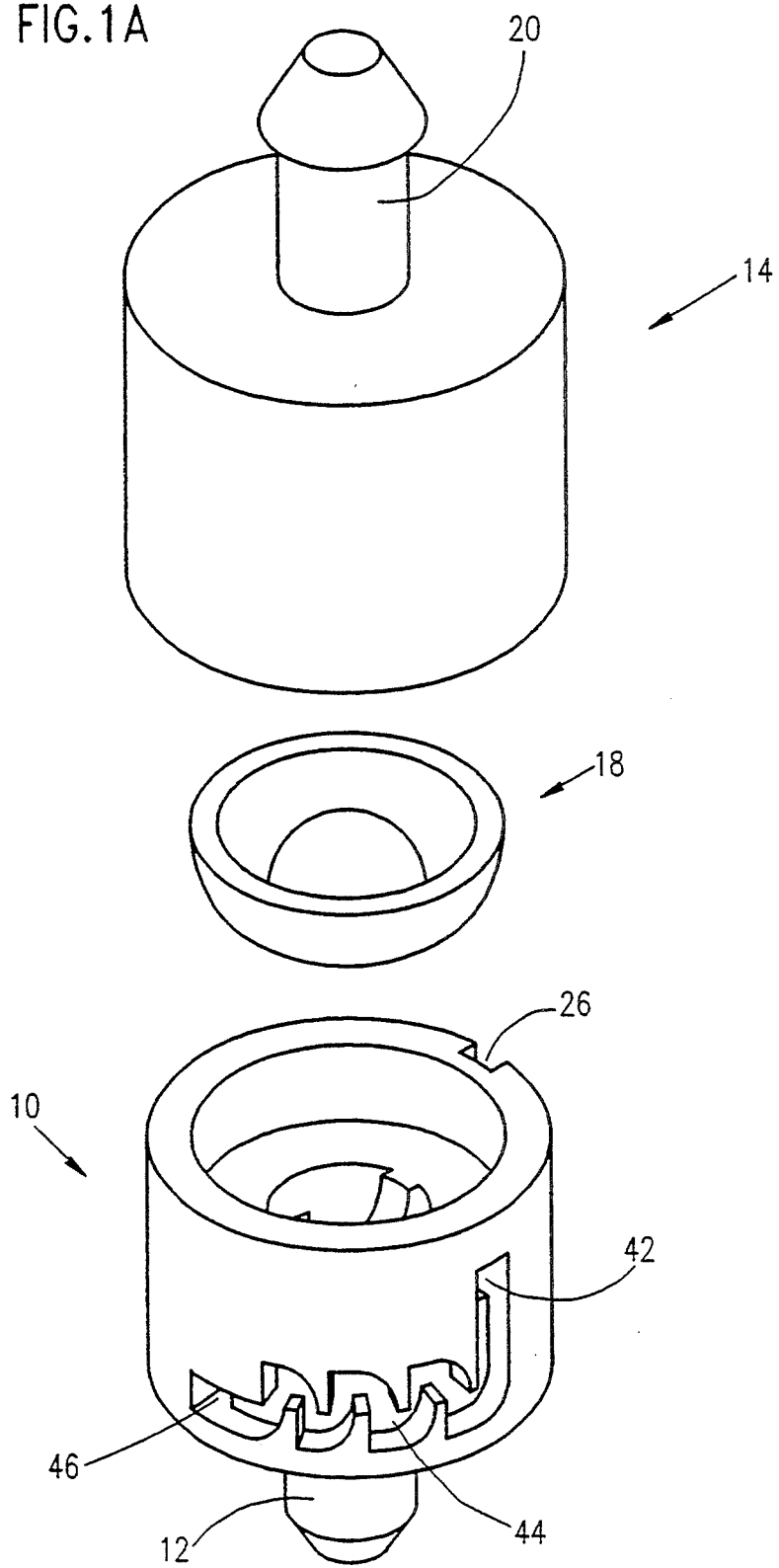
FIGS. 1A and 1B are respective side and sectional exploded view pictorial illustrations of a drip irrigation emitter constructed and operative in accordance with a preferred embodiment of the present invention.
Figure 1B:
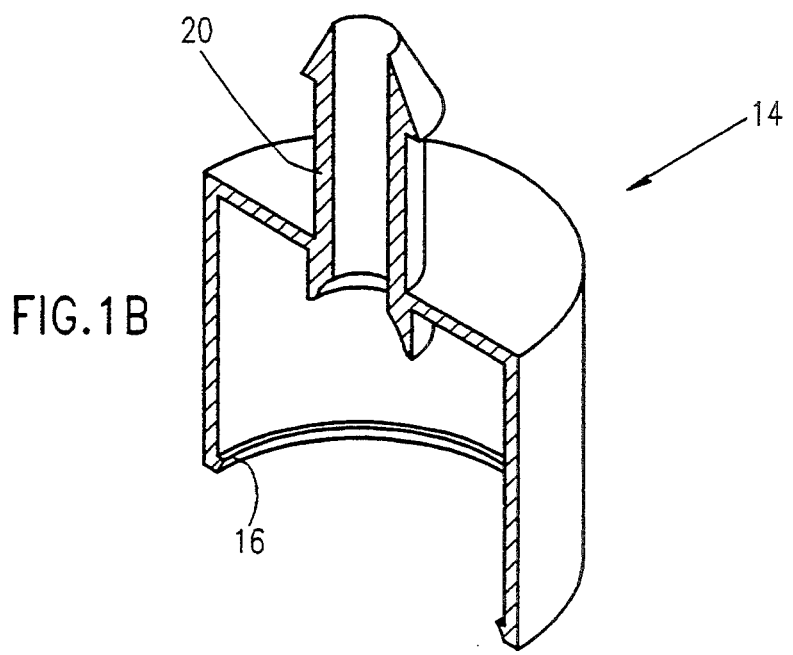
Figure 1B:
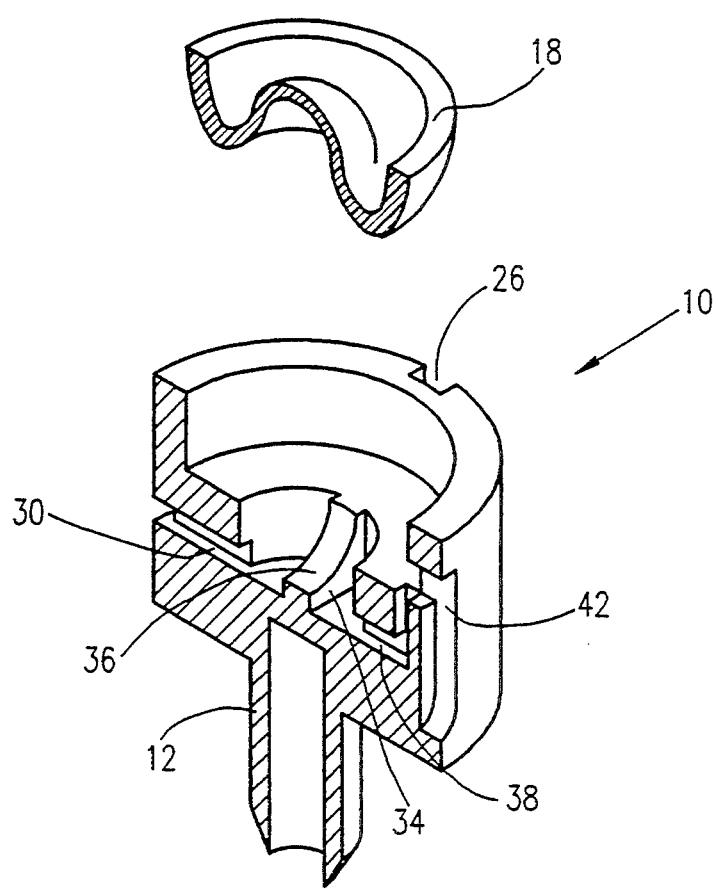
Figure 1C:
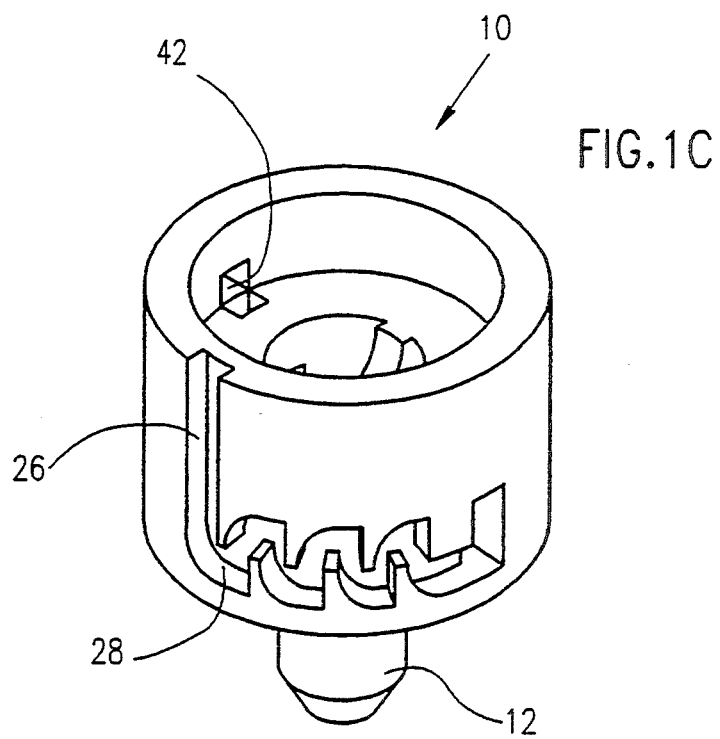
FIG. 1C is a pictorial illustration of part of the emitter of FIG. 1A, rotated by 180 degrees about its overall axis of symmetry.
Figure 2E:
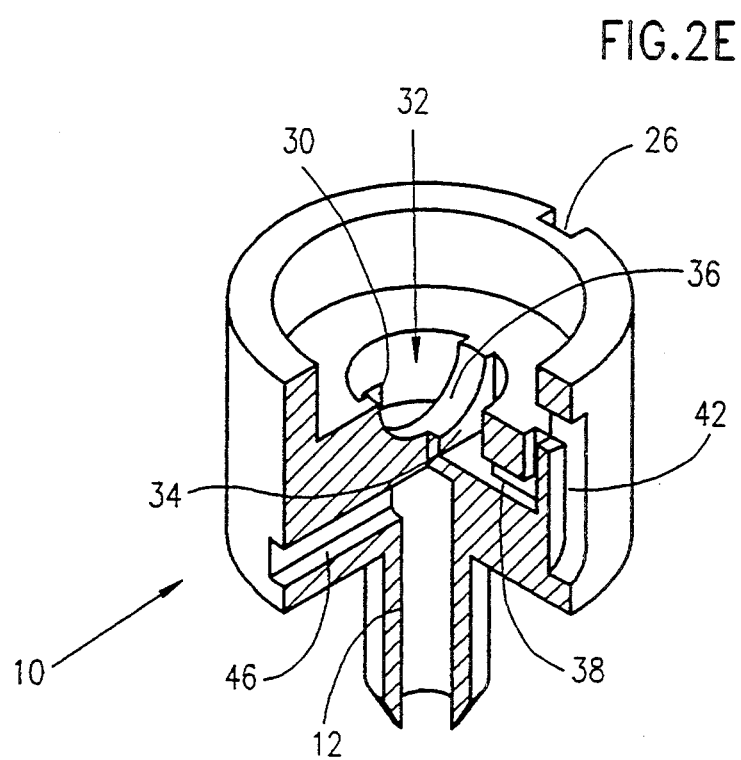
FIG. 2E is a partially sectioned illustration of part of the emitter of FIGS. 1A–2D in the orientation shown in FIG. 2D.
Figure 2B:
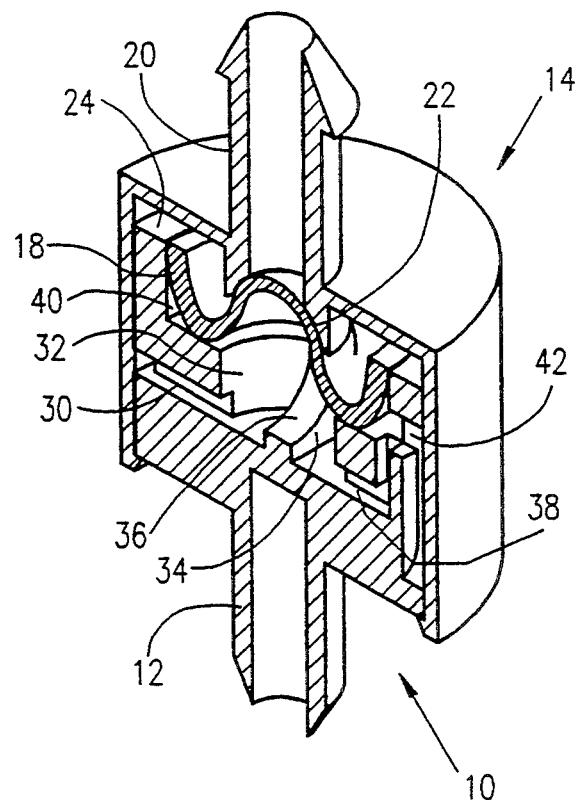
FIGS. 2A and 2B are respective side and sectional pictorial illustrations of the drip irrigation emitter of FIGS. 1A–1C.
Figure 2A:
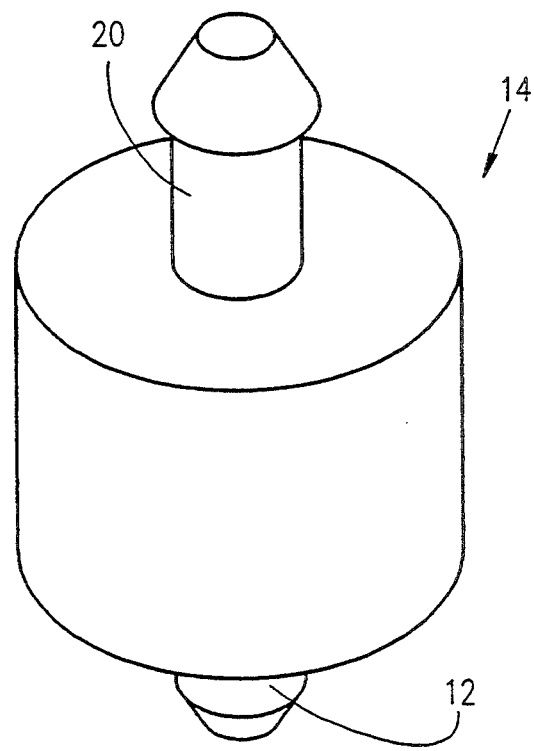
Figure 2C:
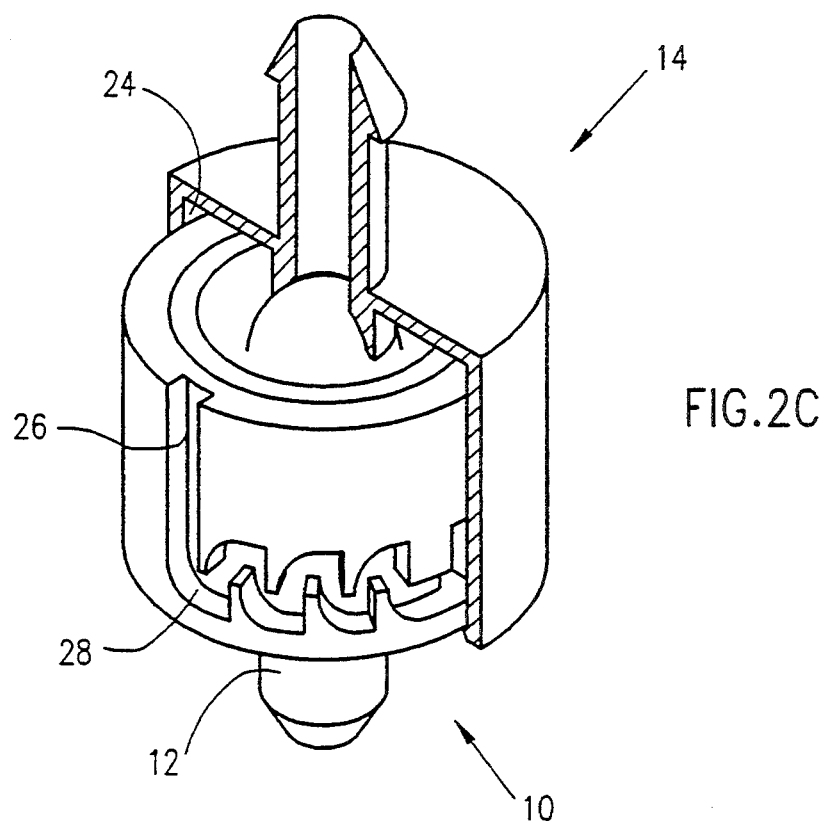
FIGS. 2C and 2D are partially cut away illustrations of the drip irrigation emitter of FIGS. 1A–2B in orientations rotated with respect to each other by 180 degrees about the overall axis of symmetry of the emitter.
Figure 2D:
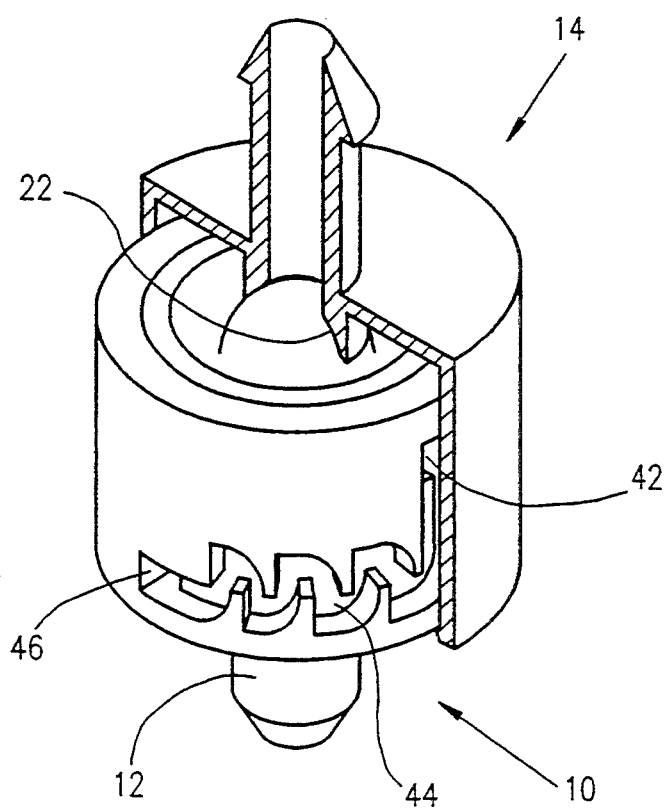

Reference is now made to FIGS. 1–4B, which illustrate a pressure compensated drip irrigation emitter constructed and operative in accordance with a preferred embodiment of the present invention. The emitter includes a housing which preferably comprises a base member 10 defining a drip irrigation outlet 12 and a cover member 14 which is arranged for snap fit engagement with the base member 10 via an engagement rim 16. The emitter also includes a membrane 18 which is mounted between the interior of the base member 10 and the cover member 14.

In accordance with a preferred embodiment of the present invention, the membrane 18 has two principal positions, a first position, in which the membrane preferably seals a water inlet and a second position, in which the membrane modulates the quantity of water flowing through a water flow path.

Figure 3A:
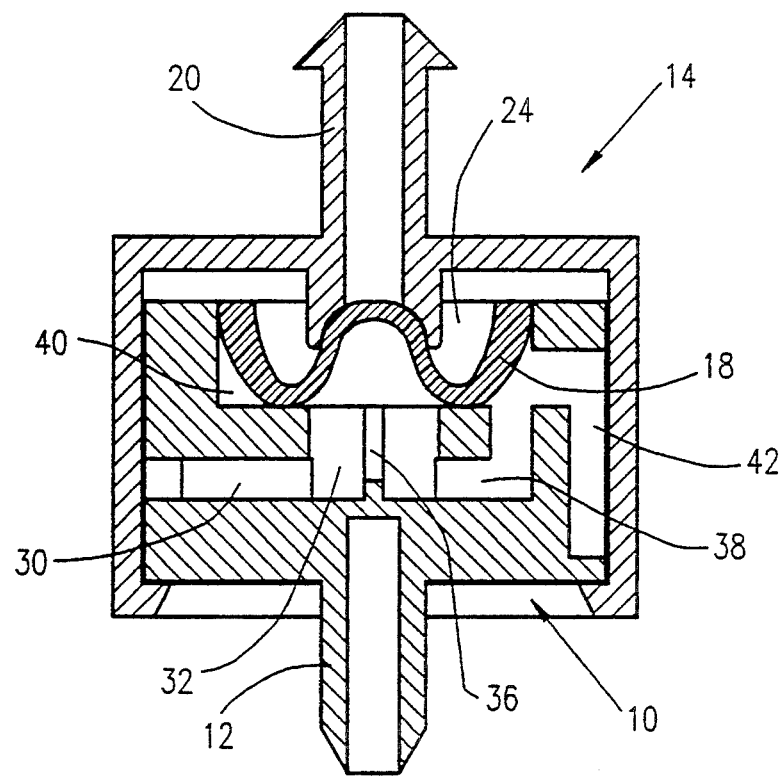

Cover member 14 defines a water inlet 20 which may be configured as shown for insertion into an aperture in a water supply line. Generally speaking, upon initial pressurization of the emitter, pressurized water from the water supply line passes through inlet 20 and forces membrane 18 from its position when unpressurized, as shown in FIG. 3A to an intermediate position, shown in FIG. 3B.

Figure 3B:
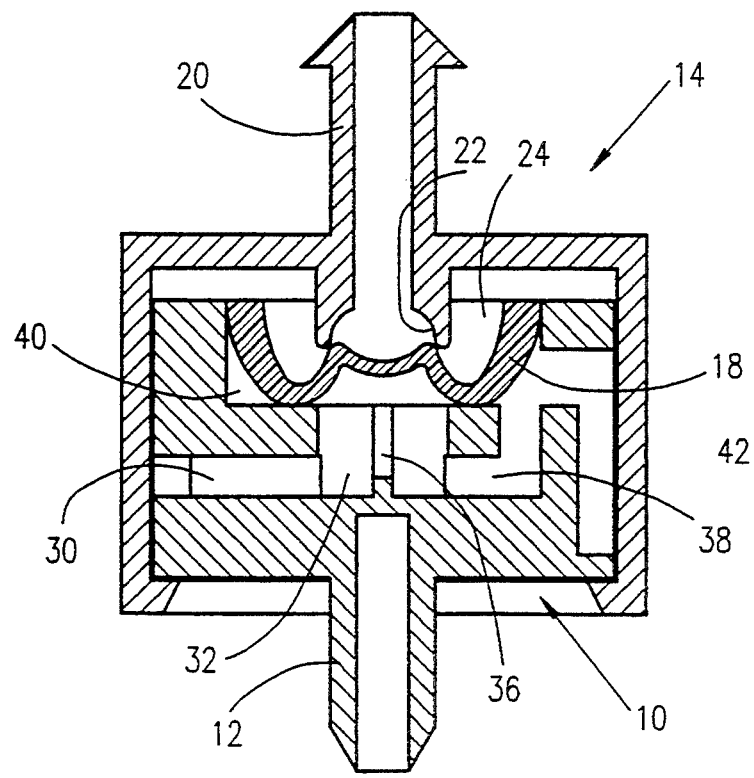

When membrane 18 is in the position shown in FIG. 3B, water from the inlet 20 passes between the membrane and inlet interior wall into a volume 24 above the membrane and from there via a passageway 26, communicating with volume 24 to a pressure reducing pathway 28, which may be of any suitable configuration, such as a configuration described in any of the above-mentioned patents of applicant/assignee, the disclosure of which is hereby incorporated by reference.

Figure 4A:
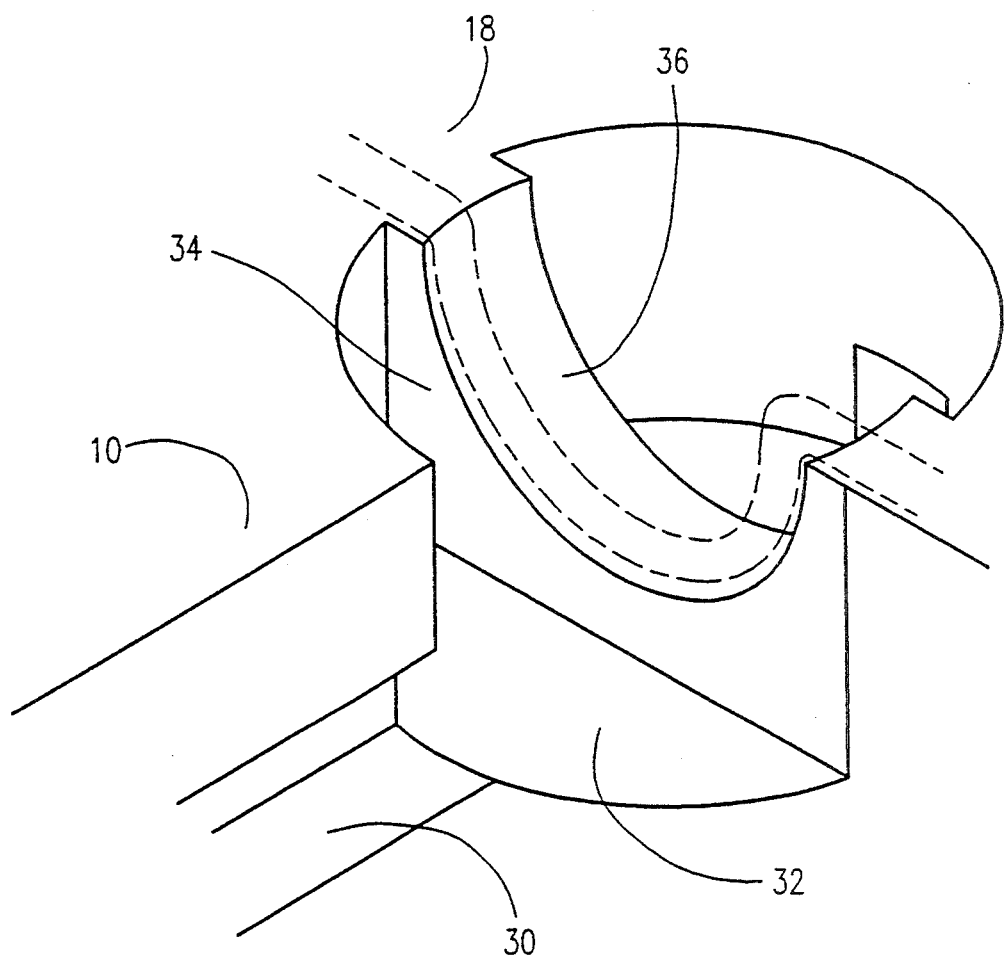
FIGS. 4A and 4B are respective pictorial and sectional illustrations indicating the positioning of the membrane against a curved support in the orientation of FIG. 3D.
Figure 4B:
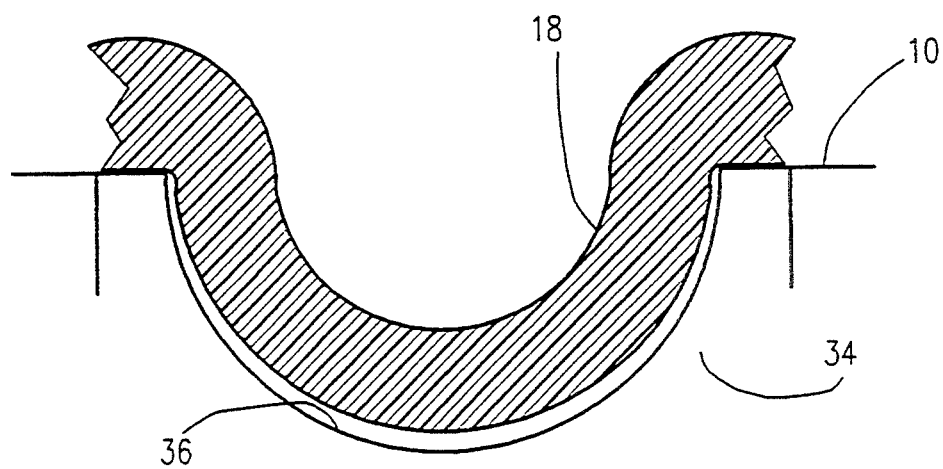

Pathway 28 terminates in a passageway 30 extending generally radially inwardly of base member 10 which communicates with a first side of an inner pressure control volume 32, which is partially and symmetrically bifurcated by a curved membrane engagement wall 34 having a membrane engagement surface 36, as illustrated in detail in FIGS. 4A and 4B.

Water which passes from the first side of volume 32 past wall 34 to the second side enters a passageway 38 which communicates with a relatively downstream flow path portion 40 surrounding membrane 18 at the underside of an intermediate portion thereof. From flow path portion 40, the water passes via a passageway 42 into a second pressure reducing passageway 44, which leads into a passageway 46, which communicates with outlet 12.

The operation of the drip irrigation emitter described above will now be summarized. As noted above, with reference to FIG. 3B, water from inlet 20 passes between the membrane 18 and wall 22 into volume 24. This flow quickly causes the membrane 18 to shift from a "center up" type of position, represented by FIGS. 3A and 3B to a "center down" type of position, represented by FIGS. 3C and 3D.

From a consideration of FIGS. 3C and 3D it can be appreciated that the engagement between the membrane 18 and the engagement surface 36 relatively upstream flow path portion provides governance of the flow of water through the emitter. It is also appreciated that the location of membrane 18 at flow path portion 40, and the resulting configuration of membrane 18 thereat, provides further governance of the flow of water through the emitter. It is further appreciated that inward displacement of the membrane 18, from its orientation in FIG. 3C to its orientation in FIG. 3D enables the membrane to be pushed closer towards engagement surface 36.

It is a particular feature of the present invention that beneficial water engagement with the membrane is provided at an additional stage of the water flow through the emitter, as compared with the prior art, thus providing more responsive pressure compensation than in the prior art and as a result, enabling the emitter to provide suitably pressure compensated output rates over a significantly greater range of input pressures.

It will be appreciated by persons skilled in the art that the present invention is not limited by what has been particularly shown and described hereinabove. Rather the scope of the present invention is defined only by the claims which follow.

I claim:

1. Drip irrigation apparatus comprising:
   a housing including a water inlet, a water outlet and a water flow path extending therebetween; and
   a pressure responsive membrane disposed within the housing and arranged to govern the flow of water, said pressure responsive membrane having a peripheral side wall portion and a central portion,
   said water flow path including:
      a first relatively upstream flow path portion which passes adjacent said central portion of said membrane, said first relatively upstream flow path portion having a flow path cross section which is governed by the position of the central portion of said membrane, and
      a second relatively downstream flow path portion which passes adjacent said peripheral side wall portion of said membrane,
      said membrane being positioned relative to said water flow path such that an inward displacement of the membrane at said second relatively downstream flow path, enables said central portion of said membrane to be displaced relative to said housing so as to decrease said flow path cross section of said first relatively upstream flow portion,
      said water flow path also comprises a first pressure reducing pathway disposed upstream of said first relatively upstream flow portion.

2. Drip irrigation apparatus according to claim 1 and wherein said water flow path also comprises a second pressure reducing pathway disposed downstream of said second relatively downstream flow path portion.

3. Drip irrigation apparatus according to claim 1 and wherein said housing is formed of a base member and a cover member.

4. Drip irrigation apparatus according to claim 1 and wherein said membrane has two principal positions, a first position, in which the membrane seals the water inlet and a second position, in which the membrane modulates the quantity of water flowing through the water flow path.

5. Drip irrigation apparatus according to claim 1 and wherein said membrane has two principal positions, a first position, in which the membrane seals the water inlet and a second position, in which the membrane modulates the quantity of water flowing through the water flow path.

6. Drip irrigation apparatus according to claim 2 and wherein said membrane has two principal positions, a first position, in which the membrane seals the water inlet and a second position, in which the membrane modulates the quantity of water flowing through the water flow path.

* * * * *